(12) United States Patent
Prehofer et al.

(10) Patent No.: US 9,154,301 B2
(45) Date of Patent: Oct. 6, 2015

(54) LOCATION INFORMATION VERIFICATION

(75) Inventors: Christian Prehofer, Espoo (FI); Sasu Tarkoma, Helsinki (FI)

(73) Assignee: Nokia Corporation, Espoo (FI)

( * ) Notice: Subject to any disclaimer, the term of this patent is extended or adjusted under 35 U.S.C. 154(b) by 1110 days.

(21) Appl. No.: 12/148,853

(22) Filed: Apr. 22, 2008

(65) Prior Publication Data

US 2009/0265781 A1    Oct. 22, 2009

(51) Int. Cl.
G06F 21/00 (2013.01)
H04L 9/32 (2006.01)
H04W 12/06 (2009.01)

(52) U.S. Cl.
CPC ............. *H04L 9/32* (2013.01); *H04W 12/06* (2013.01); *H04L 2209/60* (2013.01); *H04L 2209/80* (2013.01)

(58) Field of Classification Search
CPC ............ H04L 63/0428; H04L 63/0823; H04L 2209/608; H04L 63/12; H04L 63/08; H04W 4/02; H04W 12/02; H04W 12/06; H04W 80/04; H04N 1/32144
See application file for complete search history.

(56) References Cited

U.S. PATENT DOCUMENTS

| 2002/0105956 A1* | 8/2002 | Saito | 370/401 |
| 2003/0177094 A1* | 9/2003 | Needham et al. | 705/50 |
| 2004/0095384 A1* | 5/2004 | Avni et al. | 345/745 |
| 2005/0262351 A1* | 11/2005 | Levy | 713/176 |
| 2007/0067634 A1 | 3/2007 | Siegler | 713/171 |
| 2007/0244942 A1* | 10/2007 | McCamant et al. | 707/206 |
| 2009/0115661 A1* | 5/2009 | Torimoto et al. | 342/387 |

FOREIGN PATENT DOCUMENTS

| AU | 2005222560 A1 | 5/2006 |
| WO | WO 03079266 A1 | 9/2003 |

OTHER PUBLICATIONS

Davis, C., et al., "A Means for Expressing Location Information in the Domain Name System", Network Working Group, Jan. 1996, 18 pgs.
National Imagery and Mapping Agency, NIMA TR8350.2, Third Edition, Amendment 1, Jan. 2000, Technical Report, Department of Defense, Word Geodetic System, 1984, 175 pgs.

* cited by examiner

*Primary Examiner* — Shewaye Gelagay
*Assistant Examiner* — Carlton Johnson
(74) *Attorney, Agent, or Firm* — Harrington & Smith

(57) ABSTRACT

Location information is provided with an authenticator in order to enable future providing of an authentication to a service or application making use of the location information. The authenticator is based on a cryptographic method known by a provider and recipient of and also optionally based on position data provided by the location information. The authenticator is carried as a watermark in the location information so that the location information can be used by prior existing systems and enables the authentication of the location information in compatible authentication enabled systems. On receiving the location information, an authentication enabled recipient obtains the authenticator from the location information and checks using the authenticator whether use of the location information may be allowed.

31 Claims, 3 Drawing Sheets

Fig. 1    100

LOCATION INFORMATION VERIFICATION

TECHNICAL FIELD

The present invention generally relates to location information verification. More particularly, though not exclusively, the invention relates to cryptographic verification of location information validity.

BACKGROUND

Positioning is rapidly becoming a very common service in privately operated cars. Modern mobile telephones are also ever more often equipped with navigation circuitry and software so as to enable a user to navigate in traffic or monitor sports training, for instance. A particularly advanced Nokia 95 8 GB phone with a sports tracker application enables tracking routes that a person has walked or cycled, for instance, and records the route in a training diary for subsequent use. The route may even be exported into a Google® map so as to view the route superimposed on a satellite photograph. Also other applications and services are growing around navigation. For interworking between different entities of one service or between different services, different standards or de-facto standards have been developed for exchanging location information.

For instance, there is an Internet standard RFC1876 that defines a new domain name server (DNS) resource record type for experimental purposes. This RFC describes a mechanism to allow the DNS to carry location information about hosts, networks, and subnets. Such information for a small subset of hosts is currently contained in the flat-file Unix to Unix CoPy (UUCP) maps. However, just as the DNS replaced the use of a HOSTS.TXT file to carry host and network address information, it is possible to replace the UUCP maps as carriers of location information. This RFC defines the format of a new resource record for the DNS, and reserves a corresponding DNS type mnemonic and numerical code. For instance, a section of Switzerland is shown on an interactive map from location 46.9524° N 7.4396° E with a code {{coord|46.9524|N|7.4396|E|region:CH}}. Moreover, there are other standards which enable standardised exchange of location information such as WGS 84 or more accurately Department of Defense (DoD) World Geodetic System 1984 (WGS 84) and Keyhole Markup Language (KML) which define different ways to deliver co-ordinate data in computer systems. The KML uses the WGS 84 datum and can be demonstrated by following sample:

```
<?xml version="1.0" encoding="UTF-8"?>
<kml xmlns="http://earth.google.com/kml/2.0">
  <Placemark>
    <description>New York City</description>
    <name>New York City</name>
    <Point>
      <coordinates>-74.006393,40.714172,0</coordinates>
    </Point>
  </Placemark>
</kml>
```

Various internet services make us of KML, including Flickr®), Google Earth™, Google Maps™, Google Mobile™ and Yahoo Pipes™.

The location information received from an external source may not be accurate due to inaccuracy of positioning, for instance, but generally it may be expected that the information received is reasonably reliable for common services using the location information.

SUMMARY

According to a first aspect of the invention there is provided an apparatus comprising:
  a memory configured to store location information comprising first part and a second part; and
  a processor configured to obtain from the second part an authenticator and to test the authenticator based on a cryptographic method known by a provider of the location information and by the apparatus.

The testing may involve checking whether the authenticator corresponds to the first part and if not, to decide that the location information cannot be positively authenticated and if yes, to decide that that the location information has been positively authenticated.

The location information may consist of a predetermined number of data bits configured to define a location or region with a given accuracy. The first part may comprise a first set most significant ones of the data bits and the second part may comprise a second set of least significant ones of the data bits.

The authenticator may comprise a replay attack protector configured to enable detecting reusing of the location information. The replay attack protector may be based on any one of the following: a detail related to a desired client or user of the location information; time; date; random number; and any combination thereof.

According to a second aspect of the invention there is provided a method comprising:
  storing location information comprising first part and a second part;
  obtaining from the second part an authenticator; and
  testing the authenticator based on a cryptographic method known by a provider of the location information and by the apparatus.

The testing may involve checking whether the authenticator corresponds to the first part and if not, deciding that the location information cannot be positively authenticated and if yes, deciding that that the location information has been positively authenticated.

According to a third aspect of the invention there is provided an apparatus comprising:
  a memory configured to store location information comprising a first part and a second part; and
  a processor configured to include in the second part an authenticator based on a cryptographic method known by the apparatus and by intended recipient of the location information.

The recipient may refer to an application or service that is intended to be capable of obtaining the authenticator from the location information.

According to a fourth aspect of the invention there is provided a method comprising:
  storing location information comprising a first part and a second part; and
  including in the second part an authenticator based on a cryptographic method known by the apparatus and by intended recipient of the location information.

The authenticator may be based on the cryptographic method and on the first part.

According to a fifth aspect of the invention there is provided a computer program comprising computer executable program code for causing an apparatus to perform the method according to any one of: the second aspect; the fourth aspect; and the second aspect together with the fourth aspect.

The various embodiments illustrated in this summary are only non-limiting examples. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
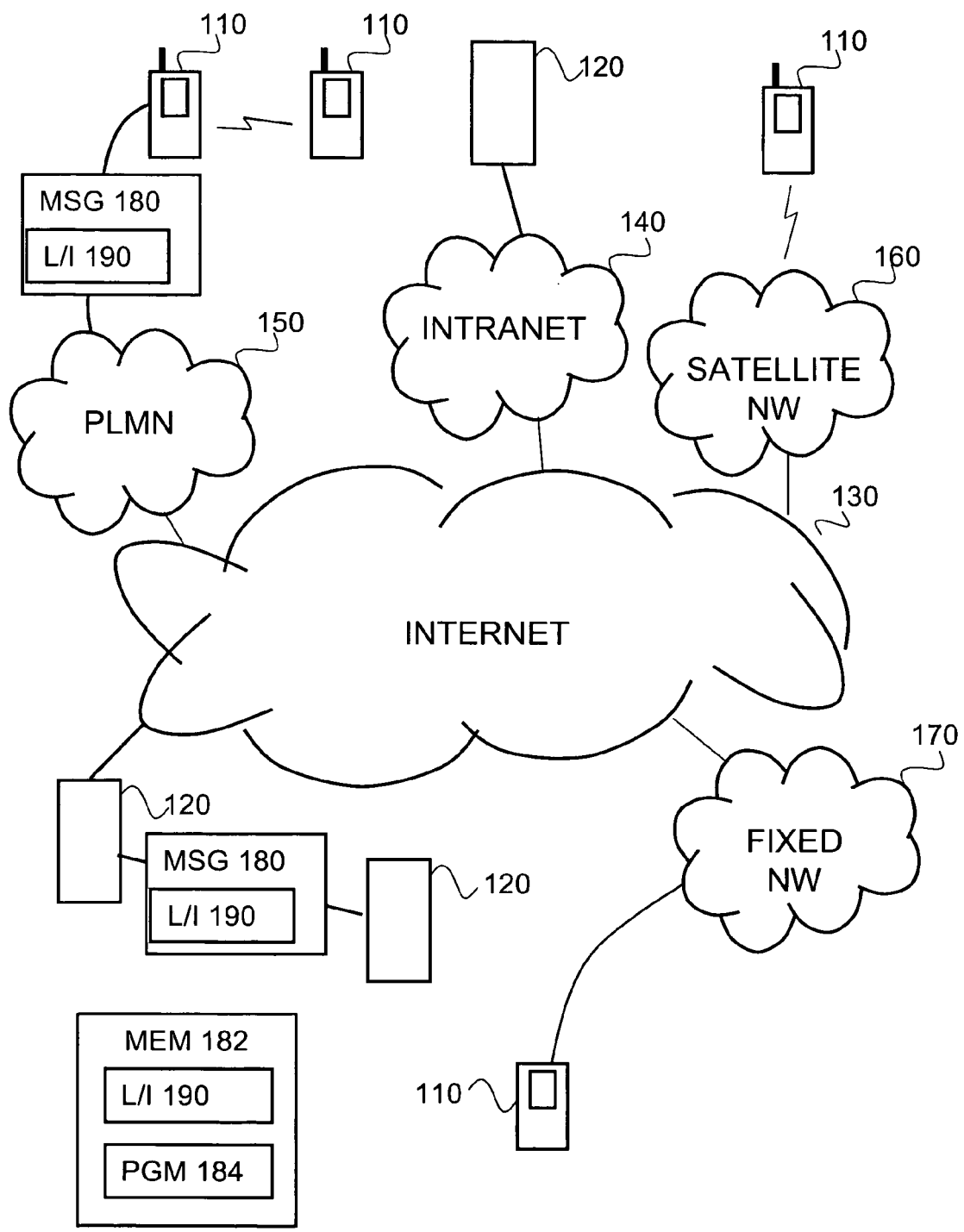
FIG. 1 shows an exemplary simplified block diagram of a system suited for implementing an embodiment of the invention.

FIG. 1 shows an exemplary simplified block diagram of a system 100 suited for implementing an embodiment of the invention. The system comprises a plurality of terminals 110 and servers 120 which may be communicatively connected in a communication system comprising any one or more of the Internet 130, intranets 140, mobile communication networks 150, satellite communication networks 160, fixed communication networks 170, and direct connections between terminals 110 and/or servers 120. An example of the structure of the terminals 110 is described in detail in connection with FIG. 4 and an example of a server 120 is described in detail in connection with FIG. 5. The terminals 110 and servers 120 may be commonly referred to as different entities. FIG. 1 further shows location information messages 180 travelling between various entities. The location information messages contain at least location information 190 the format of which may correspond to that shown in FIG. 6. The system may also comprise alternatively or additionally to the communication system one or more transferable memory media 182. The transferable memory media 182 may comprise location information 190 and/or computer executable program code 184 for use in connection with particular embodiments of the invention.

Figure 2:
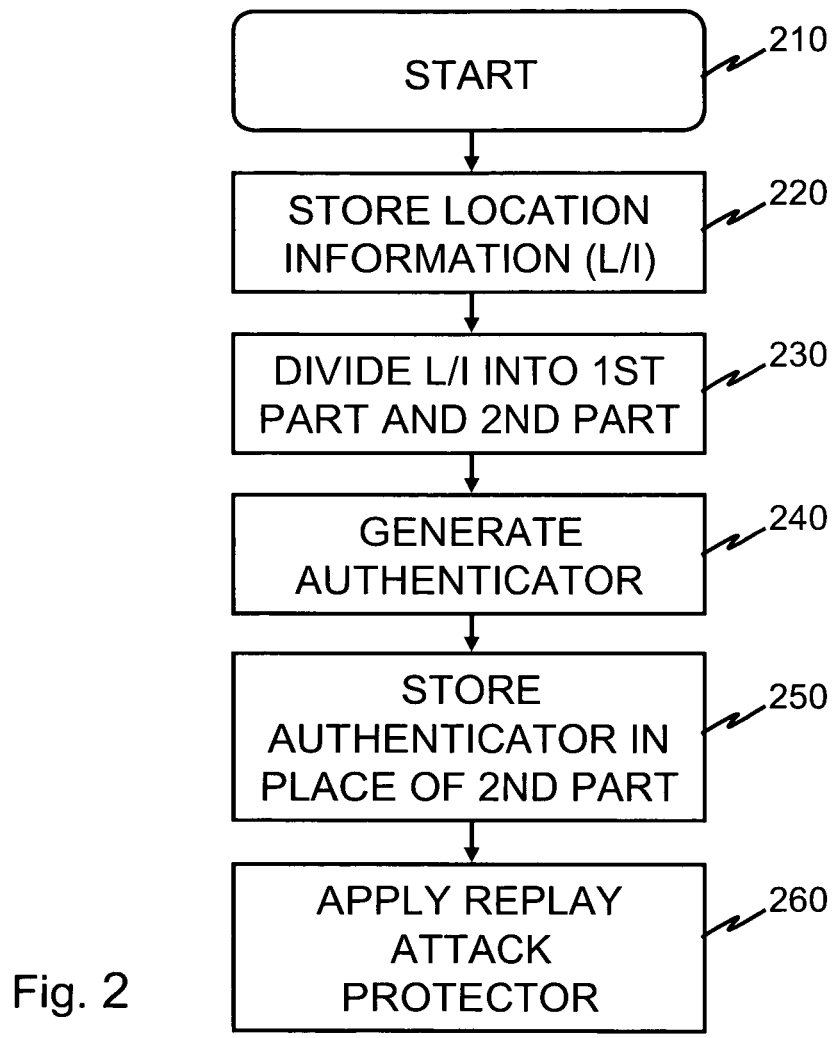
FIG. 2 shows an exemplary simplified flow chart corresponding to operation in a coding apparatus in an embodiment of the invention.

FIG. 2 shows an exemplary simplified flow chart corresponding to operation in a coding apparatus in an embodiment of the invention. The flow chart starts from step 210 in which the apparatus is ready to operate. This readiness may refer to being idle or performing other tasks, but being able to start one or more new tasks substantially simultaneously with prior pending tasks.

The apparatus then subjects given location information 190 to encoding or creation of an authenticator. The apparatus stores 220 the location information 190, typically on receiving the location information from a communicatively connected entity such as a positioning device.

The apparatus next divides 230 the location information 190 into two parts such that a first part comprises such a portion of the location information that should not be altered in order to maintain desired positional accuracy in the location or area that is denoted by the location information and that a second part comprises information that can be altered without undue cost on positional accuracy of the location information 190. This dividing 230 may at simplest correspond to taking a given number of most significant bits of the location information and treating the remainder as the second part. In this connection it is appreciated that the location information 190 may comprise components in longitudinal, latitudinal and vertical directions or on any other co-ordinate system such as polar a co-ordinate system and that the desired accuracy in may vary for different co-ordinate parameters such as longitudinal and vertical components.

Any of the components may be represented with any number of data bits and. In sake of simplicity of description, let us assume that the location information 190 contained longitudinal and latitudinal components only, such as 32.30642° N 122.61458° W encoded simply as a string of numbers in an ASCII-formatted KML file. Hence, the latitude 32.30642 degrees could be sparsely presented by a following string of bits using ASCII code table on an 8-bit character set (numbering these bit strings in the order of appearance)

| | |
|---|---|
| 1. 00110011 | "3" |
| 2. 00110010 | "2" |
| 3. 00101110 | "." |
| 4. 00110011 | "3" |
| 5. 00110000 | "0" |
| 6. 00110110 | "6" |
| 7. 00110100 | "4" |
| 8. 00110010 | "2" |

According to one embodiment, if it is satisfactory to use only three decimals, for example, the first 96 bits fall into the first part and the remaining 16 bits for the two last characters fall into the second part. Hence, backward compatibility may be gained when embedding an authenticator into the bits corresponding to the least significant digits of the position component. Any prior existing devices would simply err to treat the authenticator as further accuracy of the position denoted by the location information 190, but normal operation would be possible.

It is an advantage of using some part of the actual co-ordinates for encoding an authenticator that even if the location information 190 were converted from one format to another, the authenticator should survive the conversion provided that the data carrying the authenticator remains through the conversion. For instance, if a co-ordinate component consisted of a given first number of bits and after conversion a smaller number of bits were available, it would be likely that some of the least significant digits of the co-ordinate component were lost. On losing some of the component information, also part of the authenticator could be lost. However, it is a further advantage of this embodiment in which a subset of the co-ordinate component information is used to carry the authenticator that even if the authenticator could become unusable for authenticating the location information 190, the location information could still be used in prior art systems to carry desired location positional information.

Moreover, by using some practically redundant part of location information 190 to carry the authenticator, the embedding of the authenticator may be also referred to as watermarking. Watermarking is a well known process in digital processing of pictures, videos and audio files in which the content of a file is subtly changes such that a normal user should not even notice the presence of the embedded information while enabled users or devices should be able to extract so concealed embedded messages. Using watermarking in position encoding the authenticator into the location information 190 enables backwards compatible operation in which compatible device may extract the authenticator whilst prior art devices may still use the location information 190 as if it were not changed. Even though a minor error is incurred by changing some data in the location information, this error would normally be lost into normal inaccuracies of the location information.

It is also appreciated that in some techniques, the number of bits for the location information is restricted, but in some other techniques, it may be possible to add further decimals. In such as case, according to different embodiments of the invention, the dividing 230 may involve adding further data into the location information and using the added data partially or solely as a carrier for the authenticator. Also in this case, after the dividing 230, the location information comprises two parts, one of which comprises actual positional information and the other one of which comprises an authenticator.

It is appreciated that according to particular embodiments, the location information 190 may be used to carry further information for a location using service or application such that the information should flow transparently through intervening entities between a source of the location information 190 and a recipient that ultimately should make use of the location information such as a server or computer application.

After or in parallel with the dividing 230 of the location information 190 into the first part and to the second part, the authenticator may be generated 240 based on the first part. In particular embodiments of the invention, the authenticator is generally so generated that it is possible to determine whether the authenticator has been generated based on the first part, but it is impossible or at least computationally too challenging for normal user equipment to construe such a fake for first part that would pass the testing of the authenticator. Thus, different cryptographic hash techniques are particularly suited. Some examples of functions usable as hash functions include linear hash, rolling hash, Rabin-Karp string search algorithm, Zobrist hashing and Bloom filter. In addition to these cryptographic methods or alternatively, any other known cryptographic method may be applied particularly in embodiments in which the authenticator is not at least solely intended for verifying the first part. For instance, AES, DES, PGP, Blowfish, Rijndael, Public Key Interchange (PKI) and Kerberos are well-known methods that can be used alone or in combination.

Alternatively, the authenticator is generated 240 by using a given cryptographic method commonly known by a source and recipient of the location information 190, but not necessarily using the first part in generating the authenticator. For instance, the authenticator may provide a ticket or code for using a particular location based service or application.

After or even during the generating 240 of the authenticator, the authenticator may be stored 250 in place of the second part. Thus modified location information 190 is ready for testing for authenticating one or more co-ordinates in the location information.

As part of forming the authenticator, a replay attack protector or nonce may be applied 260 so as to inhibit non-allowable reusing once formed location information 190. In this case, the replay attack protector may be obtained from a targeted user or equipment to which the location information 190 is to be provided or the replay attack protector may be obtained from elsewhere, possibly from a mutually reliable source such as a mobile telecommunications network operator, and used in the following data session with targeted user.

The replay attack protector may also comprise temporal information such as the present time of day or a time associated with a message received or transmitted to a targeted user.

In an embodiment, the authenticator comprises a pointer to an address to authentication information accessible over a data connection. In this embodiment, a service may be provided in a network oriented fashion so that a trusted service provider verifies that the authenticity of the location information 190. In such a service, the service provider may provide for creation of the pointer based on the location information. In order to hinder abuse of the service provider to verify faked location information, the service provider may rely on a trusted software and/or equipment and produce the pointer only on identifying a trusted source. In this case, a shared secret may be used to verify a trusted relationship between the source and the service provider. It is also appreciated that the authenticator may be necessarily relatively short so that providing for sufficiently many different true authenticators in a large network may be challenging. However, to this end, predetermined information related to the targeted user such as network address of the targeted user may be used to form another part of the pointer so as to enable a larger selection of alternatives.

There are also embodiments in which backwards compatibility is not maintained and the process of adding the authenticator alters co-ordinate information in a manner which may prevent prior art systems from working correctly.

In one embodiment, injective and perfect hashing may be employed so that for one or more co-ordinate component, the entire component is hash coded so that it is possible to uniquely identify the original component from the hash code.

According to one embodiment, the character coding is changed in order to seek for better bit efficiency. The list that was presented in the foregoing with bit-values of one sparsely coded co-ordinate component clearly illustrates that in this way of coding, the three leading bits for each character are redundant. The redundant bits may be used to carry the authenticator. In one embodiment, the encoding known from the Wireless Application Protocol is used to more efficiently encode the location information. Moreover, in yet another embodiment, any redundant bits are so as to produce a type of lossy compression of the location information and make use of the redundant bits in every character.

In yet another embodiment, the authenticator may be added as a new data field in the location information. For instance, in case of a file such as a KML file, it may be possible to introduce an all new data field for carrying the authenticator. In this case, the location information may be compatible with such prior existing systems which are capable of ignoring the new data field. In this case, the authenticator may comprise a digital rights management (DRM) file. With a DRM file, it may be possible to control further distribution and usage of the location information.

In yet another embodiment, the authenticator alters a part of the co-ordinate information such that an application capable of using the authenticator is able to derive also enhanced location information. The enhanced location information may comprise higher precision position data and/or a secondary positioning system data, such as in-building co-ordinates.

Figure 3:
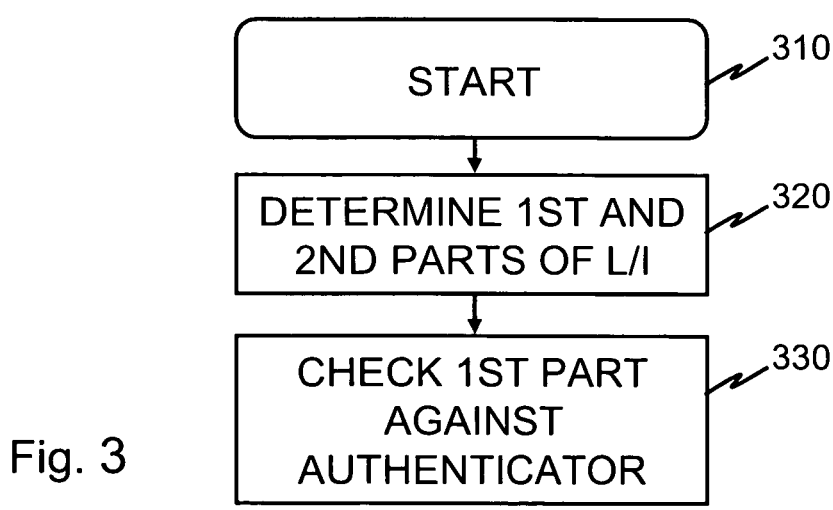
FIG. 3 shows an exemplary simplified flow chart corresponding to operation in a decoding apparatus in an embodiment of the invention.

FIG. 3 shows an exemplary simplified flow chart corresponding to operation in a decoding apparatus in an embodiment of the invention. The process of FIG. 3 starts from step 310, in which the decoding apparatus is ready to start verifying the location information 190. The decoding apparatus next divides 320 the location information 190, that is, determines a first part that represents actual positional information and determines a second part that represents the authenticator. The decoding apparatus next or in parallel makes use of the authenticator. For instance, the decoding apparatus may check 330 whether the authenticator matches with the first part or whether the authenticator passes a cryptographical testing to verify use or access of a given location related application or service.

In case that the authenticator is a code computed based on the first part, the decoding apparatus may independently perform the checking. In case that the authenticator is a pointer to a network based service, the decoding apparatus may exchange information with the network based service so as to cause checking whether the first part is that based on which the authenticator i.e. pointer had been created.

As part of the making use of the authenticator, the process may involve verifying that the authenticator is compatible with a current replay attack protector. This verifying of the replay attack protector or nonce may involve using the nonce as one reference on making use of the authenticator.

Figure 4:
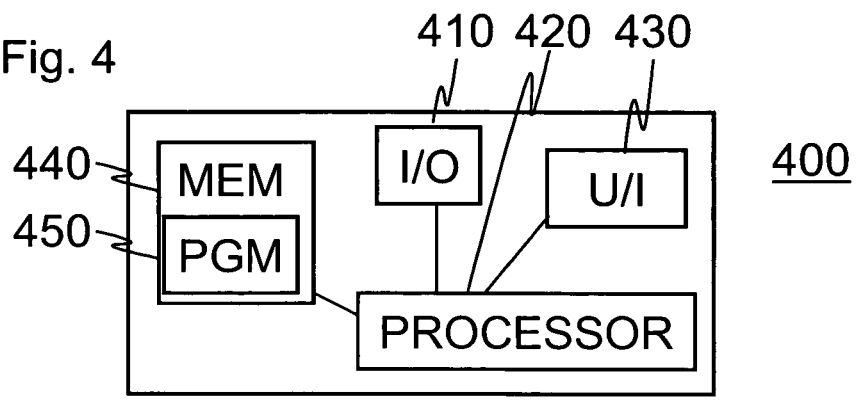
FIG. 4 shows an exemplary block diagram of an apparatus of an embodiment of the invention.

FIG. 4 shows an exemplary block diagram of an apparatus 400 of an embodiment of the invention. The apparatus 400 may be suited for operating as a service provider device, encoding device and/or as a decoding device in particular embodiments of the invention. The apparatus 400 may be for example a computing device, a desk side computer, a desktop computer, a portable computer, a laptop computer, a handheld computer, a Personal Digital Assistant (PDA), a mobile device, a mobile phone, or a game console.

The apparatus 400 may comprise a communication interface unit 410, a processor 420, a memory 440, and a user interface controller 430. The processor 420 may be communicatively connected to the communication interface unit 410, the memory 440, and to the user interface controller 430. FIG. 4 also shows a computer program 450 stored in the memory 440. When loaded into and executed in the processor 420, the computer program 450 may enable the apparatus 400 to operate as a processing element according to an embodiment of the invention. Alternatively, some embodiments of the invention operate using hardwired circuitry either as such or in combination with some software.

The communication interface unit 410 may be e.g. a radio interface module for example for any one of the following: wireless local area network, Bluetooth, cellular network such as GSM/GPRS, CDMA, or WCDMA, WIMAX, Flarion or a wired communication such as a local area network or optical fiber. The communication interface unit 410 may be integrated into the apparatus 400 or into an adapter, card or the like that may be inserted into a suitable slot or port of the apparatus 400. The communication interface unit 410 may support one communication technology or a plurality of technologies. FIG. 4 shows one communication interface unit 410, but the communication interface unit 410 may comprise a plurality of commonly located or distributed simultaneously or alternatingly usable communication interfaces.

The processor 420 may comprise a central processing unit, a microprocessor, a digital signal processor, a master processing unit, a graphics processing unit, or the like. FIG. 4 shows one processor 420, but the apparatus 400 may comprise a plurality of processors. The apparatus 400 may for instance comprise a baseband processor and a multimedia processor.

The memory 440 may comprise any of the following examples: a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a memory or smart card, such as a subscriber identity module or UMTS subscriber identity module, or the like. The apparatus 400 may comprise a plurality of memories 440. The memory 440 may be formed as a part of the apparatus 400 or it may be inserted into a slot, port, or the like of the apparatus 400. The memory 440 may serve the sole purpose of storing data, or it may be configured to operate as a part of an apparatus serving other purposes, such as processing data.

The user interface controller 430, coupled to the processor 420, may comprise circuitry for receiving input from a user of the apparatus 400. The circuitry may comprise for instance a keyboard, graphical user interface shown on the display of the apparatus 400, speech recognition circuitry, and/or an accessory device, such as a headset. The circuitry may comprise for providing output to the user a vibration alerting element, a printer, a graphical user interface or a loudspeaker, for instance.

A skilled person appreciates that in addition to the devices shown in FIG. 4, the apparatus 400 may comprise any further devices, such as microphones, displays, and in addition or alternatively any of input/output circuitry, memory chips, application-specific integrated circuits, processing circuitry for specific purposes such as source coding/decoding circuitry, channel coding/decoding circuitry, ciphering/deciphering circuitry.

As mentioned hereinbefore, the computer program 450 may enable the apparatus 400 to operate according to different embodiments of the invention.

The apparatus 400 may be configured to operate as a server of a service provider in an embodiment of the invention and/or in some embodiments as a user station for either or both encoding and decoding of location information 190.

Figure 5:
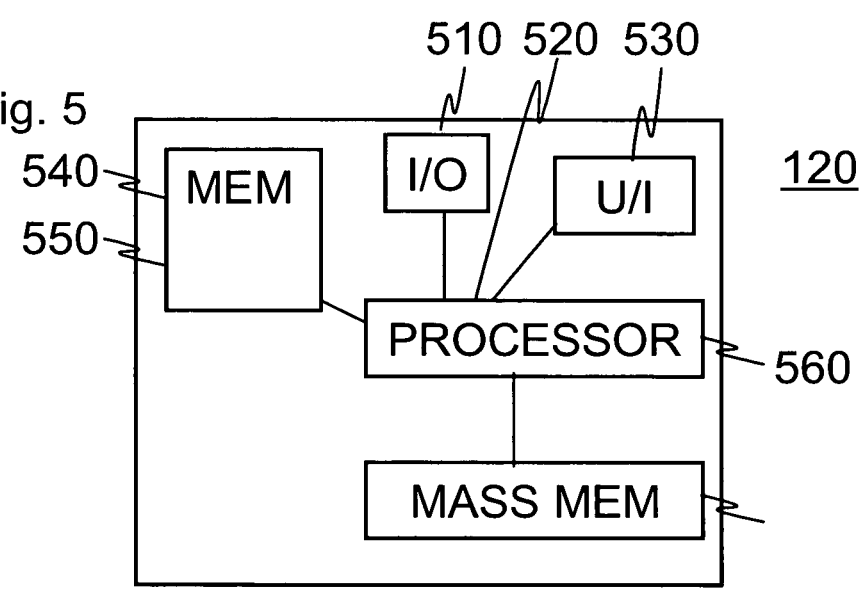
FIG. 5 shows an exemplary block diagram of a server of an embodiment of the invention.

FIG. 5 shows an exemplary block diagram of a server 500 of an embodiment of the invention. The server 500 comprises a communication interface 510 configured to exchange information with elements to which the server 500 has a communication connection either directly or via one or more intervening networks. The server further comprises an optional user interface 530 which in case of a server may be provided as a remote console connection, a memory 540 for storing computer executable program code 550, a processor 560 for controlling the operation of the server 120 based on the program code 550, and a mass memory 570 such as a hard disc. It is appreciated that the components of the server 500 may be contained in a common box or rack, or alternatively some of the components of the server 500 may be distributed into co-located or physically separated functionally connected units. Apart from the program code 550, the server may be based on a prior existing server. The server 500 may be configured to perform a process according to any embodiment of the invention, such as one according to either one or both of FIGS. 2 and 3.

Figure 6:
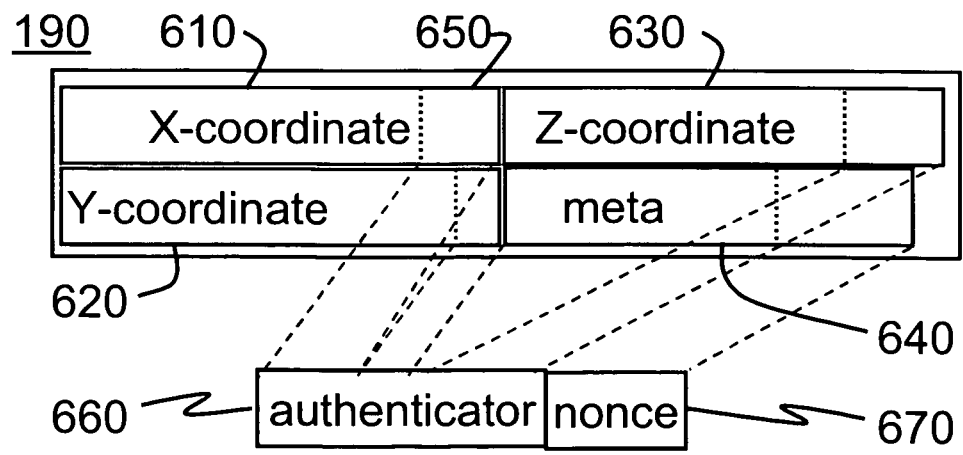
FIG. 6 shows an example of formatting of location information according to an embodiment of the invention.

FIG. 6 shows an example of formatting of location information 190 according to an embodiment of the invention. The location information 190 shown in a simplified form in FIG. 6 may be a KML file, for instance. FIG. 6 presents three different location components denoted as an X-coordinate 610, a Y-coordinate 620 and a Z-coordinate 630. Further, the location information 190 shown in FIG. 6 has optional meta data 640, which may comprise user provided or automatically formed supplementary information such as comments related to a given location, time, or a label for the location such as "home", "office", "123", or "team building exercise venue 2008". Any data element in the location information may be of textual or binary format. FIG. 6 aims to illustrate that the different location components (610 to 630) may have a varying portion 650 separated thereof as indicated with a dashed line for dividing of a second part as described in the foregoing. In FIG. 6, a common authenticator 660 and a replay attack protector nonce 670 are drawn as computed based on all the location components, while in some embodiments an authenticator may be computed separately for each or given ones of the location components 610 to 630.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention. For instance, it has been described in the foregoing how different ways of representing position data such as satellite navigation data (e.g. GPS) may be authenticated. It is appreciated that the invention is not limited to using generally outdoors navigation systems, but in different embodiments, the location information corresponds to particular in-doors position data.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus, comprising:
   at least one processor; and
   at least one memory including computer program code, where the at least one memory and the computer program code are configured, with the at least one processor, causing the apparatus to at least:
   receive location information defining location coordinate data of a location;
   store the location information;
   divide data bits of the location information into a first part and a second part, wherein the dividing comprises taking a portion of the location information comprising most significant ones of the data bits of the location information as the first part and taking a remainder of the location information comprising least significant ones of the data bits and redundant data bits of the location information as the second part, wherein the dividing is such that the data bits in the first part maintain a desired positional accuracy of the location coordinate data and the data bits of the second part altered without affecting the desired positional accuracy of the location coordinate data;
   store in the second part of the location information an authenticator corresponding to the first part comprising replacing least significant data bits of the second part of the location information with the authenticator, wherein the redundant data bits of the second part are used storing the authenticator, wherein the authenticator is based on a watermarking process, wherein the watermarking process conceals the authenticator in the second part, and wherein the watermarking process enables backwards compatibility allowing the location data of both the first and second parts used without extracting the authenticator; and
   extract from the second part the stored authenticator; and test the authenticator for positive authentication.

2. The apparatus according to claim 1, wherein the testing comprises the at least one memory including the computer program code configured, with the at least one processor, causing the apparatus to check whether the authenticator corresponds to the first part and causing the apparatus, if the authenticator does not correspond to the first part, to decide that the location information cannot be positively authenticated and causing the apparatus, if the authenticator corresponds to the first part, to decide that that the location information has been positively authenticated.

3. The apparatus according to claim 1, wherein the location information consists of a predetermined number of data bits configured defining the location or region coordinate data with a given positional accuracy.

4. The apparatus according to claim 1, wherein the authenticator comprises a replay attack protector configured enabling detecting reusing of the location information.

5. The apparatus according to claim 4, wherein the replay attack protector is based on any one of the following: a detail related to a desired client or user of the location information; time; date; random number; and any combination thereof.

6. The apparatus according to claim 1, wherein the data bits of the second part are altered storing the authenticator in place of the least significant ones of the data bits.

7. The apparatus according to claim 1, wherein the location coordinate data comprises an X-coordinate, a Y-coordinate, and a Z-coordinate of the location.

8. The apparatus according to claim 1, wherein the authenticator comprises a pointer to an address of a network based service used to test the extracted authenticator, and wherein the testing using the network based service comprises checking that the authenticator is generated using the data bits of first part of the location information.

9. A method comprising:
   receiving location information defining location coordinate data of a location;
   storing the location information;
   dividing data bits of the location information into a first part and a second part, wherein the dividing comprises taking a portion of the location information comprising most significant ones of the data bits of the location information as the first part and taking a remainder of the location information comprising least significant ones of the data bits and redundant data bits of the location information as the second part, wherein the dividing is performed such that the data bits in the first part maintain a desired positional accuracy of the location coordinate data and the data bits of the second part altered without affecting the desired positional accuracy of the location coordinate data;
   storing in the second part of the location information an authenticator corresponding to the first part comprising replacing least significant data bits of the second part of the location information with the authenticator, wherein the redundant data bits of the second part are used storing the authenticator, wherein the authenticator is based on a watermarking process, wherein the watermarking process conceals the authenticator in the second part, and wherein the watermarking process enables backwards compatibility allowing the location data of both the first and second parts used without extracting the authenticator;
   extracting from the second part the authenticator; and
   testing the authenticator for positive authentication.

10. The method according to claim 9, wherein the testing involves checking whether the authenticator corresponds to the first part and if not, deciding that the location information cannot be positively authenticated and if yes, deciding that the location information has been positively authenticated.

11. The method according to claim 9, wherein the location information consists of a predetermined number of data bits configured defining the location coordinate data with a given positional accuracy.

12. The method according to claim 9, wherein the authenticator comprises a replay attack protector configured to enable detecting reusing of the location information.

13. The method according to claim 12, wherein the replay attack protector is based on any one of the following: a detail related to a desired client or user of the location information; time; date; random number; and any combination thereof.

14. The method according to claim 13, wherein the location coordinate data comprises an X-coordinate, a Y-coordinate, and a Z-coordinate of the location.

15. The method according to claim 9, wherein the authenticator comprises a pointer to an address to a network based service used to test the extracted authenticator, and wherein the testing using the network based service comprises checking that the authenticator is generated based on the first part using the data bits of first part of the location information.

16. An apparatus comprising:
at least one processor; and
at least one memory including computer program code, where the at least one memory and the computer program code are configured, with the at least one processor, causing the apparatus to at least:
divide data bits of location information defining location coordinate data into a first part and a second part, wherein the dividing comprises taking a portion of the location information comprising most significant ones of the data bits of the location information as the first part and taking a remainder of the location information comprising least significant ones of the data bits and redundant data bits of the location information as the second part, wherein the dividing is such that data bits of the first part maintains a desired positional accuracy of the location coordinate data defined by the location information and the data bits of the second part are altered without affecting a desired positional accuracy of the location; and
store an authenticator corresponding to the first part comprising replacing least significant data bits of the second part of the location information with the authenticator, wherein the redundant data bits of the second part are used storing the authenticator, wherein the authenticator is based on a watermarking process, wherein the watermarking process conceals the authenticator in the second part, and wherein the watermarking process enables backwards compatibility allowing the location data of both the first and second parts used without extracting the authenticator, and wherein the authenticator is based on a cryptographic method known by the apparatus and by an intended recipient of the location information.

17. The apparatus according to claim 16, wherein the processor is further configured to compute the authenticator based on the cryptographic method and on the first part.

18. The apparatus according to claim 16, wherein the location information consists of a predetermined number of data bits configured defining the location of region coordinate data with a given positional accuracy.

19. The apparatus according to claim 16, wherein the authenticator comprises a replay attack protector configured enabling detecting reusing of the location information.

20. The apparatus according to claim 19, wherein the replay attack protector is based on any one of the following: a detail related to a desired client or user of the location information; time; date; random number; and any combination thereof.

21. The apparatus according to claim 16, wherein the location coordinate data comprises an X-coordinate, a Y-coordinate, and a Z-coordinate.

22. The apparatus according to claim 16, wherein the authenticator comprises a pointer to an address to a network based service used to at least check that the authenticator is generated using the data bits of first part of the location information.

23. A method comprising:
dividing data bits of location information defining location coordinate data into a first part and a second part, wherein the dividing comprises taking a portion of the location information comprising most significant ones of the data bits of the location information as the first part and taking a remainder of the location information comprising least significant ones of the data bits and redundant data bits of the location information as the second part, and wherein the dividing is such that data bits of the first part maintains a desired positional accuracy of the location coordinate data defined by the location information and the data bits of the second part are altered without affecting a desired positional accuracy of the location coordinate data; and
storing in the second part of the location information an authenticator corresponding to the first part comprising replacing least significant data bits of the second part of the location information with the authenticator, wherein the redundant data bits of the second part are used storing the authenticator, wherein the authenticator is based on a watermarking process, wherein the watermarking process conceals the authenticator in the second part, and wherein the watermarking process enables backwards compatibility allowing the location data of both the first and second parts used without extracting the authenticator, and wherein the authenticator is derivable based on a cryptographic method known by the apparatus and by an intended recipient of the location information.

24. The method according to claim 23, wherein the authenticator is based on the first part.

25. The method according to claim 23, wherein the location information consists of a predetermined number of data bits configured defining the location coordinate data with a given positional accuracy.

26. The method according to claim 23, wherein the authenticator comprises a replay attack protector configured enabling detecting reusing of the location information.

27. The method according to claim 26, wherein the replay attack protector is based on any one of the following: a detail related to a desired client or user of the location information; time; date; random number; and any combination thereof.

28. The method according to claim 23, wherein the location coordinate data comprises an X-coordinate, a Y-coordinate, and a Z-coordinate.

29. The method according to claim 23, wherein the authenticator comprises a pointer to an address to a network based service used to at least check that the authenticator is generated using the data bits of first part of the location information.

30. A computer readable memory comprising computer executable program code causing an apparatus when executing the program code to perform:
dividing data bits of location information defining location coordinate data into a first part and a second part, wherein the dividing comprises taking a portion of the location information comprising most significant ones of the data bits of the location information as the first part and taking a remainder of the location information comprising least significant ones of the data bits and redundant data bits of the location information as the second part, and wherein the dividing is such that data bits in the first part maintain a desired positional accuracy of the location coordinate data defined by the location information and the data bits of the second part are altered without affecting a desired positional accuracy of the location; and storing in the second part an authenticator corresponding to the first part comprising replacing least significant data bits of the second part of the location information with the authenticator, wherein the redundant data bits of the second part are used storing the authenticator, wherein the authenticator is based on a watermarking process, wherein the watermarking process conceals the authenticator in the second part, and wherein the watermarking process enables backwards compatibility allowing the location data of both the first and second parts used without extracting the authenticator, and wherein the authenticator is based on a cryptographic method known by the apparatus and by an intended recipient of the location information.

31. A computer readable memory comprising computer executable program code causing an apparatus when executing the program code performing:

receiving location information defining location coordinate data of a location;

storing the location information;

dividing data bits of the location information into a first part and a second part, wherein the dividing comprises taking a portion of the location information comprising most significant ones of the data bits of the location information as the first part and taking a remainder of the location information comprising least significant ones of the data bits and redundant data bits of the location information as the second part, wherein data bits in the first part maintain a desired positional accuracy of the location coordinate data and the data bits of the second part are altered without affecting the desired positional accuracy of the location;

storing in the second part an authenticator corresponding to the first part comprising replacing least significant the data bits of the second part of the location information with the authenticator, wherein the redundant data bits of the second part used storing the authenticator, wherein the authenticator is based on a watermarking process, wherein the watermarking process conceals the authenticator in the second part, and wherein the watermarking process enables backwards compatibility allowing the location data of both the first and second parts used without extracting the authenticator;

extracting from the second part the stored authenticator; and testing the authenticator based on a cryptographic method known by a provider of the location information and by the apparatus.

* * * * *